United States Patent
Schicker et al.

(10) Patent No.: US 12,405,178 B2
(45) Date of Patent: Sep. 2, 2025

(54) RAIL-MONITORING ELEMENT, METHOD FOR MOUNTING A RAIL-MONITORING ELEMENT, AND METHOD FOR MANUFACTURING A RAIL-MONITORING ELEMENT

(71) Applicant: Thales Management & Services Deutschland GmbH, Ditzingen (DE)

(72) Inventors: Kai Schicker, Mehltheuer (DE); Stefan Solleder, Gerlingen (DE)

(73) Assignee: Thales Management & Services Deutschland GmbH, Ditzingen (DE)

( * ) Notice: Subject to any disclaimer, the term of this patent is extended or adjusted under 35 U.S.C. 154(b) by 692 days.

(21) Appl. No.: 17/457,645

(22) Filed: Dec. 3, 2021

(65) Prior Publication Data
US 2022/0097741 A1 Mar. 31, 2022

Related U.S. Application Data

(63) Continuation of application No. PCT/EP2020/061776, filed on Apr. 28, 2020.

(51) Int. Cl.
*G01L 1/24* (2006.01)
*B61L 1/16* (2006.01)
*G01M 5/00* (2006.01)

(52) U.S. Cl.
CPC .............. *G01L 1/242* (2013.01); *B61L 1/166* (2013.01); *G01L 1/246* (2013.01); *G01M 5/0025* (2013.01)

(58) Field of Classification Search
CPC . G01L 1/242; G01L 1/246; B61L 1/16; B61L 1/63; B61L 1/66
See application file for complete search history.

(56) References Cited

U.S. PATENT DOCUMENTS

| | | | |
|---|---|---|---|
| 7,543,372 B2 * | 6/2009 | Reichle | B60M 5/00 29/841 |
| 2018/0022367 A1 * | 1/2018 | Oldewurtel | B61L 1/166 246/122 R |

(Continued)

FOREIGN PATENT DOCUMENTS

| | | |
|---|---|---|
| CN | 103 982 502 A | 8/2014 |
| CN | 108279037 A | 7/2018 |
| DE | 86 05 334 U1 | 7/1986 |

(Continued)

OTHER PUBLICATIONS

Fraunhofer Institut E-FAST-Verfahren zur Schnellhaertng von Klebstoffen, "E-FAST Procedure for Rapid Hardening of Adhesives", Fraunhofer-Institut fur Fertigungstechnik und Angewandte Materialforschung IFAM—Klebtechnik und Oberflächen, Bremen, Germany (see WO 2017/162829 A1).

*Primary Examiner* — Erika J. Villaluna
(74) *Attorney, Agent, or Firm* — Orbit IP, LLP; Marc G. Martino

(57) ABSTRACT

A rail-monitoring element includes a carrier on which a strain sensor is attached. The strain sensor may be an optical fiber having a fiber Bragg grating. The carrier has an adhesive layer for adhesive attachment to a rail having a thermally activatable or thermally curable adhesive. The adhesive layer has a heating element having contacts for receiving electrical energy. The rail-monitoring element can be installed more easily and in a manner which saves more energy.

20 Claims, 3 Drawing Sheets

(56) References Cited

U.S. PATENT DOCUMENTS

2019/0105847 A1 4/2019 Luehring et al.
2021/0156728 A1* 5/2021 Stepanenko ......... G01G 3/1402

FOREIGN PATENT DOCUMENTS

| DE | 10 2017 216 811 A1 | 3/2019 |
| EP | 3 069 952 A1 | 9/2016 |
| JP | S5981373 A | 5/1984 |
| WO | 2016/150670 A1 | 9/2016 |
| WO | 2017/162829 A1 | 9/2017 |
| WO | 2019/057875 A1 | 3/2019 |

* cited by examiner

RAIL-MONITORING ELEMENT, METHOD FOR MOUNTING A RAIL-MONITORING ELEMENT, AND METHOD FOR MANUFACTURING A RAIL-MONITORING ELEMENT

CROSS-REFERENCE TO RELATED APPLICATIONS

This continuation application claims priority to PCT/EP2020/061776 filed on Apr. 28, 2020 which has published as WO 2020/249300 A1 and also the European patent application number 19180254.5-1001 filed on Jun. 14, 2019, the entire contents of which are fully incorporated herein with these references.

FIELD OF THE INVENTION

The invention relates to a rail-monitoring element comprising a carrier on which a strain sensor, in particular comprising an optical fiber having a fiber Bragg grating (FBG), is attached, the carrier having an adhesive layer for adhesive attachment to a rail having a thermally activatable or thermally curable adhesive. The invention further relates to a method for mounting a rail-monitoring element and to a method for manufacturing a rail-monitoring element.

BACKGROUND OF THE INVENTION

A rail-monitoring element with FBG sensors is known from DE 10 2017 216 811 A1, for example.

To make rail traffic safer, rail-monitoring elements, for example sensor elements for axle counters, are used. Axle counters can be used in particular to check whether the location of the axle counter has been completely passed by a train, for example to determine whether the associated track sections are free or occupied. Such rail-monitoring elements comprise sensor elements that usually have to be attached to the rail.

Fiber optic sensors are becoming increasingly important in measurement systems. One or more sensors embedded in optical waveguides, such as fiber Bragg gratings, are used to detect an expansion or a compression of the optical fiber caused by a mechanical variable, and thus to be able to detect forces, torques, accelerations, loads, pressure states, etc.

EP 3 069 952 A1 and WO 2016/150670 A1 describe the use of fiber optic sensors with fiber Bragg gratings (FBG) as strain sensor elements on railroad tracks, for example as the rail contact of an axle counter.

DE 10 2017 216 811 A1 describes a method in which a rail-monitoring element is adhesively attached to a rail. Attachment by means of a heat activated adhesive is proposed. Activation is achieved by heating the rail using an inductive heating element. However, a great deal of energy is required for this, since a large volume (rail) has to be heated in order to ensure sufficient heat input into the adhesive layer of the rail-monitoring element.

A method for connecting two joining elements is described in WO 2017/162829 A1. The joining elements are connected by means of a thermally activatable adhesive and a flat heating element arranged therein. The adhesive is heated by the heating element by supplying electrical energy to the heating element.

It is the object of the invention to propose a rail-monitoring element and a method for manufacturing a rail-monitoring element in which mounting can be carried out more easily and in an energy saving manner. It is a further object of the invention to propose a simplified method for mounting a rail-monitoring element.

SUMMARY OF THE INVENTION

This object is achieved by a rail-monitoring element according to claim 1, a method for mounting a rail-monitoring element according to claim 11, and a method for manufacturing a rail-monitoring element according to claim 14. The dependent claims specify advantageous embodiments of the invention.

The rail-monitoring element according to the invention comprises a carrier on which a strain sensor, in particular comprising an optical fiber having a fiber Bragg grating, is attached. The carrier is a flat element that has the purpose of receiving and stabilizing the strain sensor. The carrier also has an adhesive layer for adhesive attachment to a rail. The adhesive can be activated or cured thermally. According to the invention, the adhesive layer comprises a heating element having contacts for receiving electrical energy.

A thermally activatable adhesive is, for example, a heat activated film (HAF). A thermally activatable adhesive is a finished adhesive whose curing is blocked or extremely slowed down. The blockage is released when exposed to heat and the adhesive begins to cure quickly or at an accelerated rate.

A thermally curable adhesive is an adhesive whose curing process is accelerated with heat. A thermally curable adhesive is therefore also called, for example, a heat-curing adhesive. This means that a thermally curable adhesive cures much faster when exposed to heat than at lower temperatures. Curing refers to the crosslinking of the adhesive; the crosslinking process being accelerated under heat.

The adhesive layer is preferably located on the side of the carrier opposite the strain sensor. This allows the carrier to be attached to the rail, for example to the rail web of the rail, and allows the desired sensor data to be supplied to the strain sensor unaffected by the adhesive layer.

The invention thus provides an energy-efficient method of heating the adhesive. The heat source is placed exactly where it is needed, i.e. in the adhesive layer. This reduces the energy required to heat the adhesive. For example, the entire rail or the entire rail web does not have to be heated.

In preferred embodiments of the invention, the heating element is designed in the form of a wire, a grid or, for example, is flat. A flat design can be, for example, a film, a mesh or a fabric. Corresponding wire meshes can be lasered, for example. The advantage of these embodiments is that the heating element has a large surface contact with the adhesive of the adhesive layer and thus the heat can be transferred effectively into the adhesive surface of the adhesive layer. This allows for further energy savings.

In a preferred embodiment of the invention, the heating element is embedded in the adhesive layer. Such an embedding can be manufactured, for example, in a sandwich process, in which an adhesive layer is applied to the carrier, the heating element is applied to said layer and a second adhesive layer is then applied to the heating element. This adhesive-heating-element-adhesive sandwich layer can be applied, for example, during manufacture of the rail-monitoring element, as described above. Alternatively, it is also possible to apply this adhesive-heating-element-adhesive sandwich layer to the carrier during mounting, i.e., shortly prior to application to the rail, as described above. This allows great flexibility in the manufacturing and mounting processes of the rail-monitoring element.

In one embodiment of the invention, it is also possible for the heating element to be applied to the adhesive layer. One possibility here is that the heating element is arranged between the adhesive layer and the carrier. Alternatively, the adhesive layer is applied between the heating element and the carrier. Both embodiments are possible.

In a preferred embodiment of the invention, the heating element comprises a thermally conductive, electrically insulating sheath. This sheath allows, on the one hand, good heat transfer between the heating element and adhesive layer and, on the other hand, good electrical insulation. For example, an enameled wire can be used as a heating element for this purpose. The electrical insulation here provides that the electrical current applied to the heating element does not come into electrical contact with other parts of the rail-monitoring element. The insulating sheath prevents, for example, an electrical contact from being established between the heating element and, for example, the rail and/or, for example, the carrier of the rail-monitoring element. The insulating sheath further simplifies the manufacturing and mounting of the rail-monitoring element. Since the heating element is electrically insulated, it is not a problem if the insulating sheath contacts the rail, for example. The insulating sheath protects against electrical contact. In the same way, it is possible for the heating element with its insulating sheath to be in contact with the carrier. The electrically insulating sheath prevents electrical current from being transferred to the carrier and, for example, the sensor element. Such simple assembly and robustness are particularly advantageous for use in the railway sector and on the rail. Compared to uninsulated heating elements, this embodiment also has the advantage that no spacer elements have to be provided in the adhesive layer in order to prevent the heating element from coming into contact with the rail. These spacer elements can therefore be dispensed with, which leads to a further simplification of the mounting or manufacturing of the rail-monitoring element. The insulating sheath around the heating element is also advantageous because the heating element can be designed in such a way that portions of the heating element can cross or be arranged very close to one another without causing a short circuit as a result. This further facilitates the mounting. This also allows a closer arrangement of the heating element, e.g. the heating wires, in the adhesive layer.

In a preferred embodiment of the invention, the adhesive layer is a heat activated film (HAF). A heat activated film is a film made of adhesive that is activated by heat; i.e., the linkage in the adhesive and thus the adhesive effect begins as a result of heat. For example, two heat activated films can surround a heating wire in a sandwich-like manner. These heat activated films can be activated by supplying electrical energy to the heating wire.

By embedding a temperature sensor in the adhesive layer, the process of heating the adhesive layer can be controlled even more precisely by reading the sensor data and observing a certain temperature range. If a fiber Bragg grating is used as the strain sensor, the temperature monitoring can already be carried out precisely by bonding the fiber Bragg grating, so that an additional temperature sensor can be dispensed with in such an embodiment.

The adhesive layer preferably has a thickness of between 0.5 and 1.5 mm, for example 0.8 mm. This thickness is advantageous in order to be able to compensate for any curvature or unevenness of the rail and still achieve a sufficient adhesive effect. The viscosity of the adhesive should be pasty or "stable" (20,000 to 100,000 mPas). This ensures that, despite the relatively large thickness of the adhesive layer selected, said adhesive layer does not emerge from the space between the carrier and the rail during mounting.

Particularly when using heat activated adhesives, to activate said heat activated adhesives, in addition to heating the adhesive layer, a contact pressure is preferably exerted on the adhesive layer, for example between 0.3 bar and 0.7 bar, preferably approx. 0.5 bar. The heating element is therefore preferably designed in such a way that it is not pressure-sensitive to such pressures. When applied to the rail web, the adhesive surface is vertical with regard to gravity. This means that a contact pressure on the adhesive surface is required, since the rail-monitoring element to be bonded could otherwise slip. This results in a double benefit from the contact pressure: It prevents slipping during vertical bonding and at the same time allows the heat activated adhesive to be activated.

The invention also relates to a mounting arrangement for mounting the rail-monitoring element. The mounting arrangement comprises a rail-monitoring element, as described above, and a mobile energy supply. The heating element of the adhesive layer is electrically connected to the mobile energy supply via the contacts. The mobile energy supply supplies the adhesive layer with electrical energy and thus heats it.

A particularly preferred embodiment comprises a switch for the electrical connection of the energy supply to the contacts of the heating element and a control unit that controls the switching state of the switch. This control takes place as a function of a temperature detected by a temperature sensor, the temperature sensor preferably being arranged in the adhesive layer, as described above. In this way, the temperature of the adhesive layer can be set particularly precisely and reliably.

When mounting the rail-monitoring element according to the invention at a mounting point on a rail, the following steps should be carried out: The rail-monitoring element is positioned at the mounting point with the adhesive layer of the carrier coming into contact with the rail. The adhesive layer is then heated by supplying electrical energy to the heating element. A battery is preferably used to supply electrical energy to the heating element. The battery can be a conventional 12-V battery, for example. A mobile and/or portable voltage supply can also be used to supply electrical energy to the heating element, in particular in the region of protective extra-low voltage.

In a preferred embodiment of the invention, the electrical energy is controlled as a function of the temperature of the adhesive. The temperature of the adhesive is preferably determined by a temperature sensor embedded in the adhesive layer. In this way, the curing of the adhesive can be further favorably influenced, since the optimum temperature can be maintained as well as possible.

In one embodiment of the invention, prior to arranging the adhesive layer at the rail, heat is applied to the rail in the area of the mounting point. This heating of the rail was in addition to the heating element heating the adhesive layer. By heating the rail, the mounting point can be prepared for bonding, for example in very cold weather. This is particularly advantageous if the heat generated by the heating element would not be sufficient to cure the adhesive because the weather is too cold.

In a method for mounting a rail-monitoring element, in a first step a strain sensor, in particular comprising an optical fiber having a fiber Bragg grating, is attached to a first side of a flat carrier. An adhesive layer is then applied to the side of the carrier opposite the strain sensor. A heating element having contacts that can be supplied with electrical energy is arranged in the adhesive layer or on the adhesive layer. The arrangement of the heating element on the adhesive layer has the advantage that this arrangement can be easily manufactured. In this arrangement, the heating element is preferably provided with an insulating sheath in order to avoid direct contact between the heating element and the rail. If the heating element is arranged in a sandwich construction between two layers of the adhesive layer, an insulating sheath of the heating element can be dispensed with if the adhesive layer is chosen to be thick enough. The provision of an insulating sheath for the heating element is, however, also advantageous here, since this allows greater flexibility in the application of pressure during mounting. The heating element can be arranged and fixed in sandwich fashion, in particular between two heat activated adhesive films. The fixation is possible, for example, using static friction or pre-lamination of the heat activated films.

Further advantages of the invention can be found in the descriptions and the drawings. Likewise, according to invention, the aforementioned features and those which are to be explained below can each be used individually for themselves or for a plurality of combinations of any kind. The embodiments shown and described are not to be understood as an exhaustive enumeration but rather have exemplary character for the description of the invention.

DETAILED DESCRIPTION OF THE PREFERRED EMBODIMENTS

Figure 1:
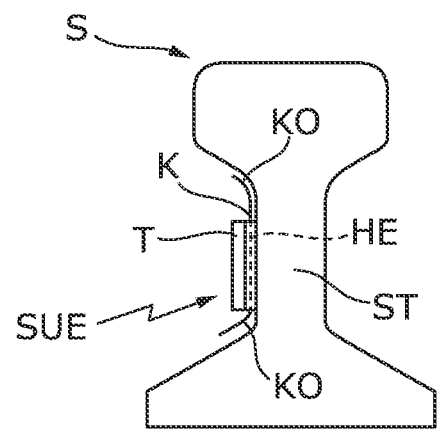
FIG. 1 shows a cross-section through a rail comprising an applied rail-monitoring element having a carrier, an adhesive layer and contacts.

FIG. 1 shows a section through a rail S having a rail web ST. A rail-monitoring element SUE, comprising a carrier T and an adhesive layer K, is mounted to the rail web. According to the invention, a heating element HE is arranged in the adhesive layer K. Contacts KO are connected to the heating element HE. The contacts KO are electrical contacts and serve to supply electrical energy to the heating element HE.

Figure 2:
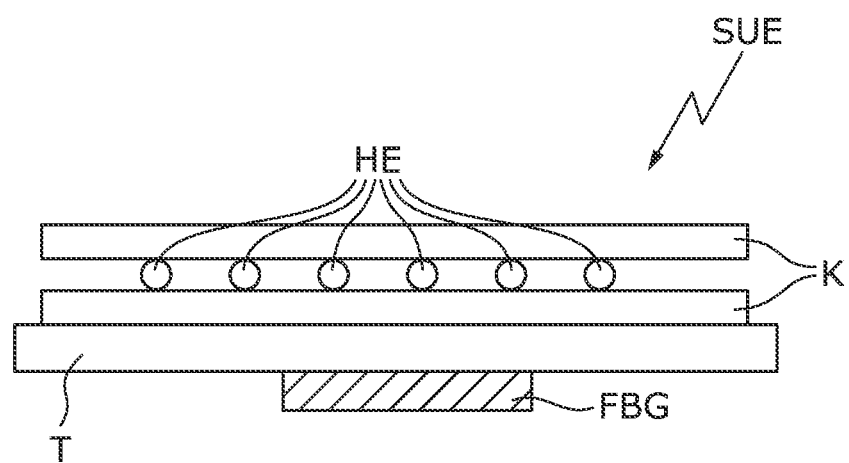
FIG. 2 shows a cross-section through a rail-monitoring element comprising a carrier with an adhesive layer, consisting of two layers and a heating element arranged between them.

FIG. 2 shows an embodiment of the rail-monitoring element according to the invention, in which the adhesive layer K applied to the carrier T consists of two layers. The heating element HE is arranged between the two layers of the adhesive layer K. FIG. 2 shows a cross-section through this arrangement. In the present example, the heating element HE consists of wires that run between the two layers of the adhesive layer K. When electrical energy is supplied to the heating element HE, the two layers of the adhesive layer K connect and enclose the heating element HE.

Figure 3:
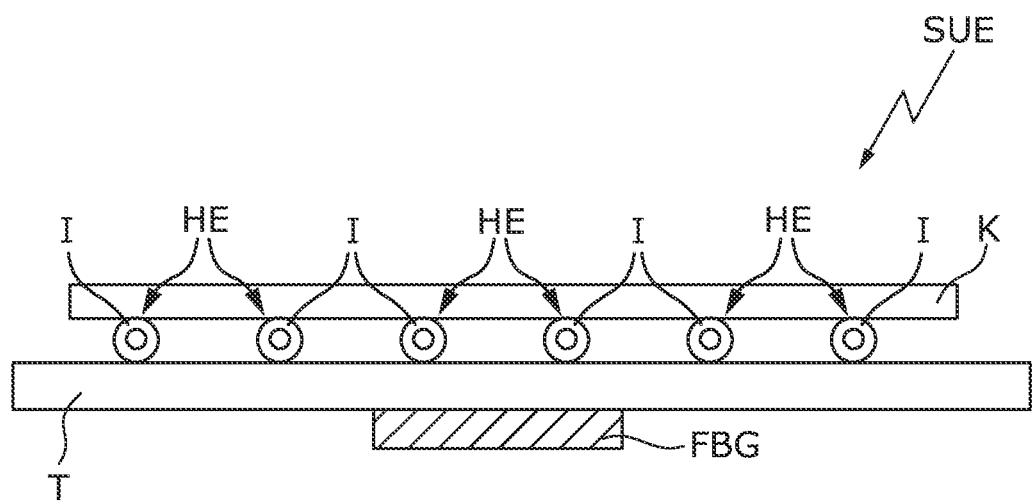
FIG. 3 shows a cross-section through a rail-monitoring element comprising a carrier having an adhesive layer and a heating element arranged thereon having an insulating sheath.

FIG. 3 shows a further embodiment of the rail-monitoring element according to the invention, in which the adhesive layer K applied to the carrier T is a single layer. The heating element HE is arranged between the adhesive layer K and the carrier T. In the present example, the heating element HE consists of wires that are surrounded by an insulating sheath I. FIG. 3 shows a cross-section through this arrangement. In the embodiment shown in FIG. 3, it is possible to arrange the heating element HE between the adhesive layer K and the carrier T, in contrast to the embodiment shown in FIG. 2, in which the heating element HE is completely embedded in the adhesive layer K. Here, electrical insulation from the carrier T is ensured by an insulating sheath I. By supplying electrical energy to the heating element HE, the adhesive layer K connects to the carrier T and encloses the heating element HE.

Figure 4:
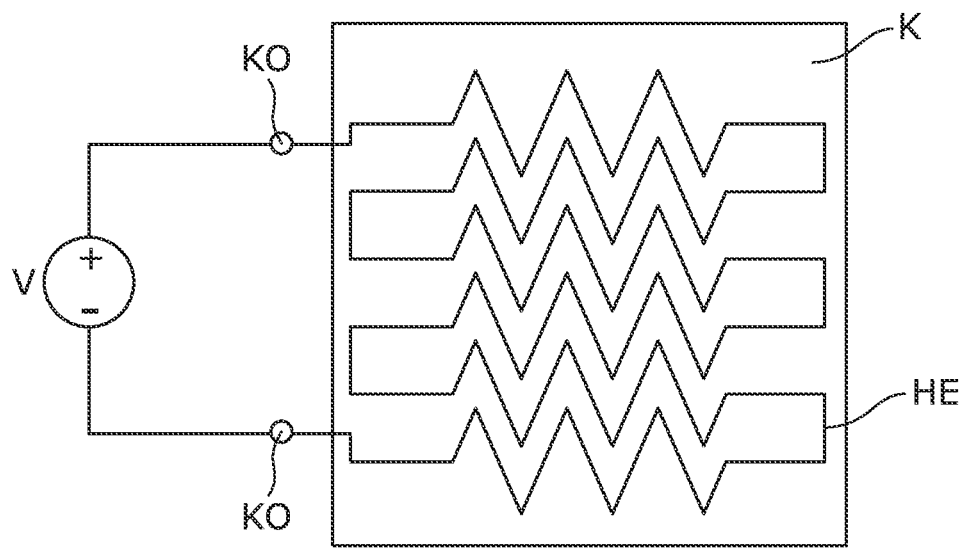
FIG. 4 is a schematic illustration of an adhesive layer comprising a heating element in the form of a grid and a voltage supply.

FIG. 4 is a schematic view of an adhesive layer K comprising a heating element HE. This can be a plan view (when the heating element is arranged on the adhesive layer) or a sectional view (when the heating element is arranged in the adhesive layer or between two layers of the adhesive layer) parallel to the surface area of the adhesive layer. In the example shown in FIG. 4, the heating element forms a type of grid, formed by a wire running zigzag and meandering over a surface. The heating element HE can run between two layers of the adhesive layer K. The heating element HE has contacts KO via which, for example, a direct voltage source V, for example in the form of a battery, is connected. The heating element HE can be supplied with electrical energy via the voltage source, for example the direct voltage source V. Instead of the direct voltage source V, it is also possible to use an alternating voltage source.

Figure 5:
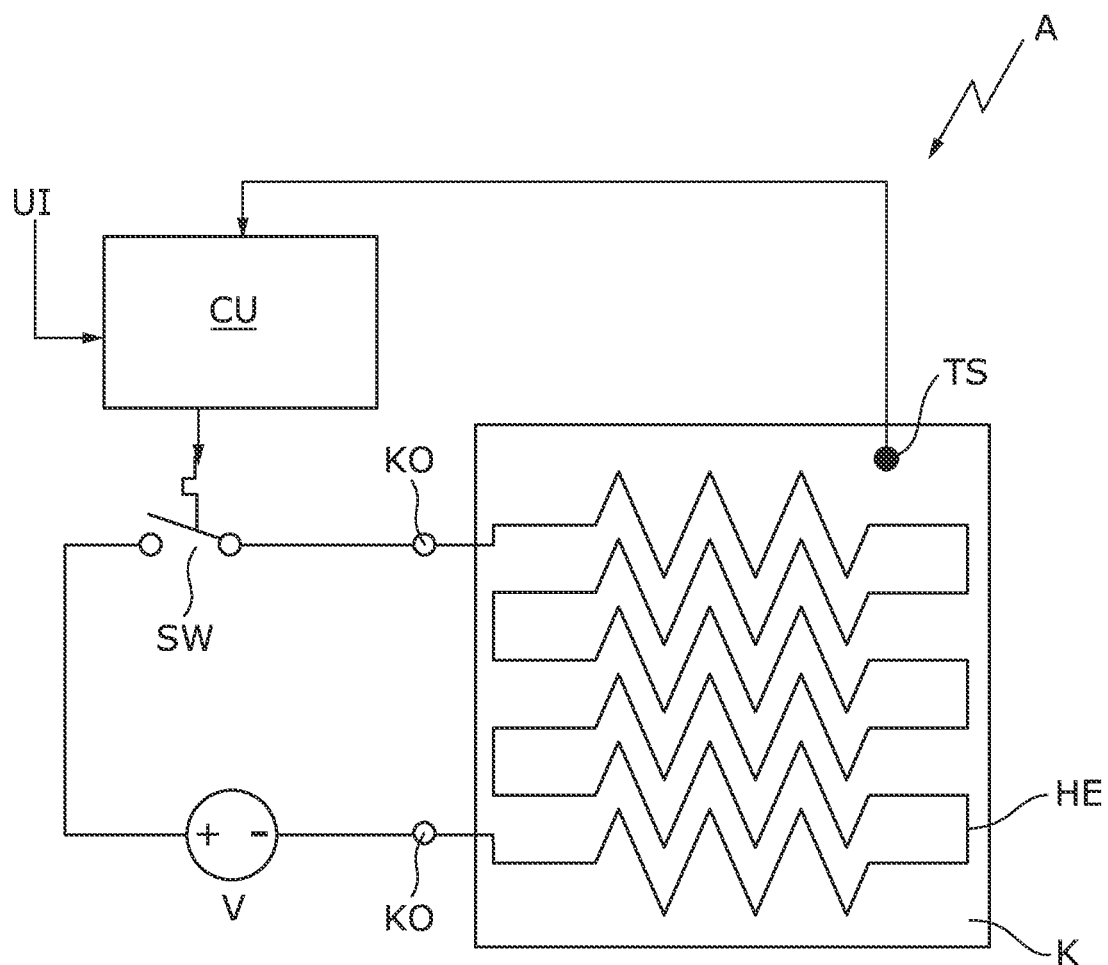
FIG. 5 is a schematic illustration of an adhesive layer comprising a heating element and a control unit.

FIG. 5 shows an arrangement A for mounting the rail-monitoring element. A temperature sensor TS is also arranged in the adhesive layer K with the heating element HE. As in FIG. 4, here too the heating element HE is connected to the direct voltage source V via the contact elements KO. The connection of the direct voltage source V to the contact elements KO is controlled in a control unit CU. This control takes place via a switch SW, which can be opened and closed by the control unit CU. The temperature sensor TS detects the temperature of the adhesive layer K. The collected data are recorded by the control unit CU. The supply of electrical energy via the contact elements KO is controlled via the switch SW as a function of the detected temperature of the adhesive layer K. A user can control the control unit CU via a user interface UI.

Figure 6:
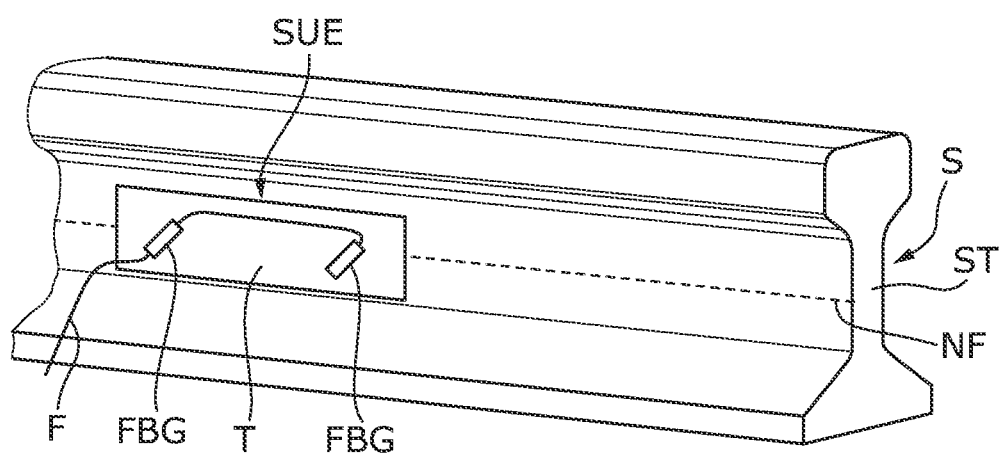
FIG. 6 is a perspective view of a rail having a rail-monitoring element attached thereto.

FIG. 6 is a perspective view of the rail S comprising a neutral axis NF. A rail-monitoring element SUE in the form of a fiber optic sensor element is mounted to the rail S. The rail-monitoring element SUE comprises a carrier T on which two fiber Bragg gratings FBG are pre-mounted. An optical fiber F connects the two fiber Bragg gratings FBG on the rail-monitoring element SUE. The rail-monitoring element SUE is preferably mounted in the region of the neutral axis NF, in particular such that each fiber Bragg grating FBG is arranged with one end below the neutral axis NF and with the other end above the neutral axis NF. The carrier T of the rail-monitoring element SUE is preferably mounted to the rail web ST of the rail S. After mounting, the direct voltage source is removed and can be used to mount additional rail-monitoring elements.

With the method according to the invention, a simple and secure planar bonding between the carrier T of the rail-monitoring element SUE and the rail S is made possible. In particular, mounting is made cheaper and simplified, which in particular improves use in the field. The rail-monitoring element SUE can be mounted faster and more safely.

LIST OF REFERENCE SIGNS

A Mounting arrangement
CU Control unit
F Optical fiber
FBG Fiber Bragg grating
HE Heating element
I Electrically insulating sheath
K Adhesive layer
KO Electrical contacts
NF Neutral axis
S Rail
ST Rail web
SUE Rail-monitoring element
SW Switch
T Carrier
TS Temperature sensor
UI User interface
V Direct voltage source

REFERENCE LIST

DE 10 2017 216 811 A1
EP 3 069 952 A1
WO 2016/150670 A1
WO 2017/162829 A1

What is claimed is:

1. A rail-monitoring element comprising:
   a carrier on which a strain sensor is attached;
   the strain sensor comprising an optical fiber having a fiber Bragg grating;
   the carrier having an adhesive layer for adhesive attachment to a rail having a thermally activatable or thermally curable adhesive;
   wherein the adhesive layer comprises a heating element having contacts that can be supplied with electrical energy;
   wherein the adhesive layer is located on the side of the carrier opposite the strain sensor.

2. The rail-monitoring element according to claim 1, wherein the heating element is in the form of a wire.

3. The rail-monitoring element according to claim 2, wherein the heating element is arranged in the form of a grid in the adhesive layer.

4. The rail-monitoring element according to claim 1, wherein the heating element is flat, being a film, a mesh or a fabric.

5. The rail-monitoring element according to claim 1, wherein the heating element is embedded in the adhesive layer.

6. The rail-monitoring element according to claim 1, wherein the heating element is applied to the adhesive layer.

7. The rail-monitoring element according to claim 1, wherein the heating element has a thermally conductive, electrically insulating sheath.

8. The rail-monitoring element according to claim 1, wherein the adhesive layer is a heat activated film.

9. The rail-monitoring element according to claim 1, wherein a temperature sensor is embedded in the adhesive layer.

10. The rail-monitoring element according to claim 1, wherein the adhesive layer has a thickness of at least 0.5 mm.

11. A mounting arrangement comprising a rail-monitoring element according to claim 1 and a mobile energy supply, the heating element comprising contacts that are electrically connected to the mobile energy supply.

12. The mounting arrangement according to claim 11, wherein a control unit controls a switching state of a switch for the electrical connection of the energy supply to the contacts of the heating element as a function of a temperature detected by a temperature sensor.

13. A method for mounting the rail-monitoring element according to claim 1 at a mounting point of the rail, comprising the following steps:
    positioning the rail-monitoring element at the mounting point, the adhesive layer of the carrier coming into contact with the rail; and
    heating the adhesive layer by supplying electrical energy to the heating element.

14. The method according to claim 13, wherein the electrical energy is controlled as a function of the temperature of the adhesive.

15. The method according to claim 13, wherein before the adhesive layer is arranged on the rail, heat is applied to the rail in the area of the mounting point.

16. The rail-monitoring element according to claim 1, wherein the adhesive layer has a thickness of at least 0.8 mm.

17. The method for manufacturing a rail-monitoring element comprising the following steps:
    attaching a strain sensor on a first side of a flat carrier;
    applying an adhesive layer on the side of the carrier opposite the strain sensor;
    wherein a heating element having contacts for receiving electrical energy is arranged in or on the adhesive layer.

18. The method according to claim 17, wherein the strain sensor comprises an optical fiber having a fiber Bragg grating.

19. The method according to claim 17, wherein the heating element is arranged and fixed between two heat activated films.

20. A rail-monitoring element manufactured by the method according to claim 17.

* * * * *